May 13, 1969 P. E. WHITING 3,443,709
POWER LIFT APPARATUS
Filed Jan. 30, 1967 Sheet 1 of 3

Peter E. Whiting
INVENTOR.
BY John E. Toupal
ATTORNEY.

May 13, 1969 P. E. WHITING 3,443,709
POWER LIFT APPARATUS

Filed Jan. 30, 1967 Sheet 3 of 3

Peter E. Whiting
INVENTOR.
BY John E. Toupal
ATTORNEY.

United States Patent Office 3,443,709
Patented May 13, 1969

3,443,709
POWER LIFT APPARATUS
Peter E. Whiting, 4 Church St.,
Framingham, Mass. 01701
Filed Jan. 30, 1967, Ser. No. 612,385
Int. Cl. B66f 9/00, 11/00, 7/24
U.S. Cl. 214—672                                    20 Claims

ABSTRACT OF THE DISCLOSURE

A self-contained, demountable power lift device adapted for use on the rear frame of a truck while in an operative position and for stowing beneath a truck trailer while in a collapsed position.

---

This invention relates generally to a power lift device for loading and unloading materials and more particularly relates to a device of this type adapted for demountable use on the bed of a truck tractor.

In the trucking industry, truck trailers are frequently utilized for transporting materials to remote unloading sites where lift trucks or similar unloading equipment are not available. The labor costs of manually unloading material in these instances comprises a significant portion of the overall transportation costs. Furthermore, manual unloading of extremely heavy and sometimes unwieldy loads can prove dangerous if not impossible. Also, there exist circumstances requiring load delivery to relatively isolated locations near which a large truck trailer cannot be driven. In these latter cases, the inconvenience and additional required costs of manual unloading are, of course, accentuated.

Attempts to alleviate this problem have resulted in the development of various power lift accessories adapted for use on truck tractors after disconnection from their trailer complements. These developments have included, for example, lift mechanisms permanently mounted on the front end of the tractor, collapsible lift assemblies permanently fixed to the beds of the tractor, wheel mounted lift units adapted for insertion as a connecting link between a tractor and its associated trailer, etc. However, all previous truck tractor lift accessories have suffered from one or more serious disadvantages which have limited their commerical success. Examples of problems encountered with prior developments include exorbitant unit costs, difficult use, interference with normal tractor operations, utility limited to particular types of tractors, lack of interchangeability between lift units and tractors, etc.

The object of this invention, therefore, is to provide a compact, relatively low cost power lift device which can be safely and easily employed with tractor-trailer combinations and which offers the desirable flexibility of interchangeable use with a variety of tractor types.

One feature of this invention is the provision with conventional mast supported power lift assembly of a vertical support and a pivotally attached horizontal support both adapted for demountable connection to a tractor bed. The flexibility obtained with this structure permits selective and interchangeable use of an individual lift device with truck tractors of various sizes and types.

Another feature of this invention is the provision of a power lift device of the above featured type wherein the horizontal support is an elongated, longitudinally extendible member adapted while connected to a tractor bed to permit substantial movement of the mast assembly in a horizontal direction away from the tractor bed. This structure permits convenient separation of the tractor and attached mast assembly prior to demounting thereof.

Another feature of this invention is the provision of a power lift device of the above featured type wherein, with the horizontal support in its extended position, the mast assembly is adapted for pivotable movement from a substantially vertical position to a substantially horizontal position along a path wherein the upper portion of the mast moves away from the attached tractor bed and the lower portion of the mast moves toward the tractor bed. This arrangement permits the collapsed mast assembly to be easily positioned in a suitable storage facility, preferably mounted on the underside of a trailer bed.

Another feature of this invention is the provision of the power lift device of the above featured types including a power mechanism adapted upon energization to produce pivotable movement of the mast assembly.

Another feature of this invention is the provision of a power lift device of the above featured types wherein the power mechanism comprises a hydraulic cylinder operatively connected to the mast assembly at a point substantially below its point of pivotable connection with the horizontal support member. In addition to fostering a compact unit for storage, this feature maintains the cylinder's piston rod in a desirable retracted position when the mast assembly has been pivoted into its horizontal storage position.

Another feature of this invention is the provision of a power lift device of the above featured types including a completely self-contained hydraulic power pack attached to the horizontal support member and adapted for mounting on the fifth wheel of a truck tractor. The self-contained power pack permits interchangeable use of the lift device on any conventional truck tractor.

Another feature of this invention is the provision of a power lift device of the above featured types including an adjustable stand adapted for actuation by the lift itself into a position wherein it supports the mast assembly from the surface supporting the attached truck tractor. The adjustable stand supports the mast assembly during extension of the horizontal support member thereby simplifying the step required for both mounting and demounting of the lift device.

Another feature of this invention is the provision of a power lift device of the above featured types including selective stops which lock the horizontal support member in any of a plurality of expanded longitudinal positions thereby permitting use of the device with tractor beds of various lengths.

Another feature of this invention is the provision of a power lift device of the above featured types including a trailer adapted for connection to the tractor bed and having on its underside a mounting frame adapted to support the collapsed mast assembly upon disconnection thereof from the tractor bed.

These and other objects and features of the present invention will become more obvious upon a perusal of the following specification taken in conjunction with the accompanying drawings wherein.

Figure 1:
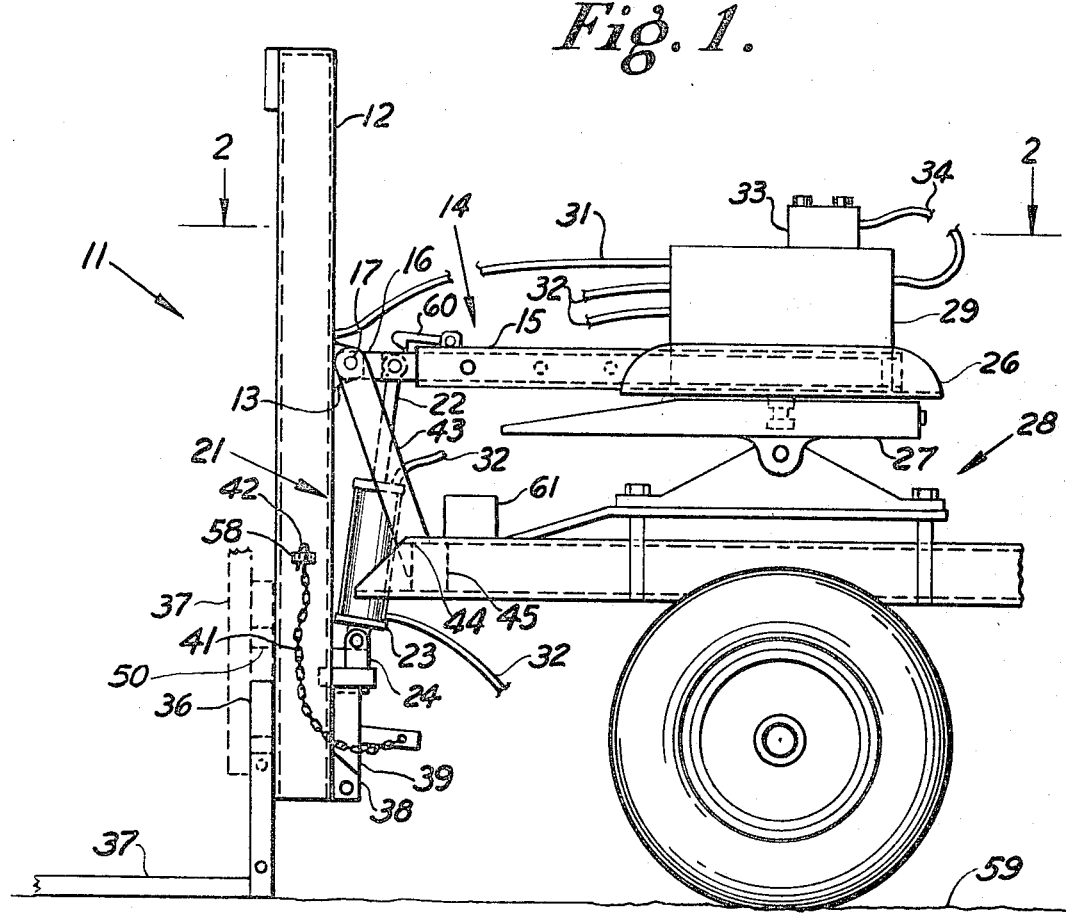
FIG. 1 is a schematic side view showing a preferred embodiment of the invention mounted on a tractor bed.
Figure 2:
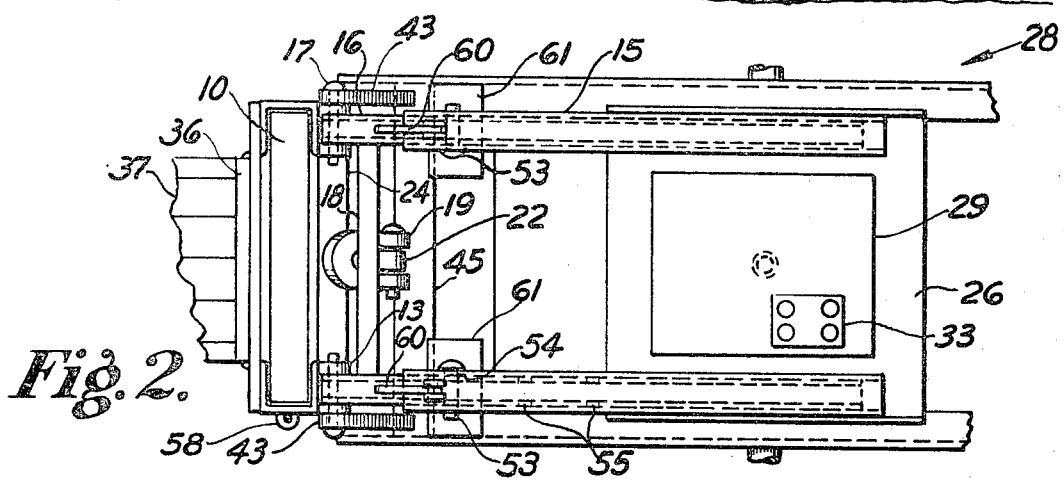
FIG. 2 is a schematic plan view of the invention shown in FIG. 1.

Referring now to the figures, there is shown the conventional power lift assembly 11 of the type commonly used, for example, with fork lift trucks. The lift assembly 11 includes the spaced apart parallel masts 12 which support for movement thereon a conventional hydraulically powered lift mechanism 10 (not shown in detail). Extending rearwardly from the midportion of each mast 12 is a pair of spaced apart, apertured ears 13. The telescopic horizontal support members 14 include the slidably engaged outer members 15 and enclosed inner members 16 having ends straddled by the protruding ears 13 and, pivotally attached thereto by the pins 17. Rigidly secured between the inner members 16 is the spacing bar 18 which supports the centrally located, spaced apart ears 19. The double acting hydraulic cylinder assembly 21 has the piston rods 22 pivotally attached to the ears 19 and the associated hydraulic cylinder 23 pivotally attached to the center of the support bar 24 which extends between the lower portions of the masts 12.

Fixedly attached between the outer members 15 is the mounting plate 26 which is adapted for connection to the fifth wheel 27 on the rear frame or bed 28 of a conventional truck tractor unit. The housing 29 is supported by the mounting plate 26 and encloses the conventional hydraulic power pack components (not shown) including fluid reservoir, fluid pump, motor, valves, etc. The hydraulic hose 31 couples the hydraulic lift mechanism 10 to the power pack 29 which is also coupled to the hydraulic cylinder 23 by the hoses 32. Conventional manual controls for operating the lift mechanism 10 and the piston rod 22 are enclosed in the portable electrical control unit 33 which is operatively connected with the power pack 29 by the electrical cable lead 34. The cable 34 is of sufficient length to permit actuation of the lift 10 or cylinder 23 by a driver positioned in the tractor's cab.

Attached to the hydraulic lift mechanism 10 are the lift forks 36 and pivotally connected perpendicular tines 37. The stand 39 has an upper end pivotally connected to brackets 38 at the bottom of the masts 12 and a lower end attached to the chain 41 which terminates with the hook 42. Also pivotally attached to the outer ears 13 by the pins 17 are the ends of the vertical support bars 43. The opposite ends of the support bars 43 have triangular notches 44 which engage the upper rear edge of the tractor bed's rectangular cross piece 45 thereby providing vertical support for the mast assembly 11.

During typical operation of the invention, the lift assembly 11 is stowed under the bed 51 (FIG. 4) of the conventional trailer unit and is transported together with a preferably palletized load of material (not shown) to an unloading site. Here, the trailer is uncoupled and the mast assembly 11 is mounted on the bed of the truck tractor as shown in FIG. 1 in a manner described below. The tractor and mounted lift assembly 11 are then utilized to unload the palletized material from the uncoupled trailer.

The unloading procedure is similar to that used with any conventional fork lift device. One merely operates the controls 33 to attain a desired elevation for the hydraulic lift mechanism 10 and associated tines 37. Subsequently, the tractor is backed toward the load until the tines 37 project into the free space under a load supporting pallet. A further upward movement of the hydraulic mechanism 10 induces lifting of the load which is also tilted slightly by actuation of the cylinder assembly 21. Because of component arrangement, this load tilting step is performed desirably by the more forceful push stroke of the piston rod 22. The load can then be transported by the tractor to its ultimate resting place.

Upon completion of the unloading operation, the lift assembly 11 is demounted and again stowed under the trailer bed 51 in the following manner. The operator removes the hook 42 from the eye 58 on the mast 12 and attaches it to the cross bar 50 between the lift forks 36 and pivots the tines 37 into an upright position adjacent the masts 12. He then actuates the controls 33 to cause upward movement of the lift mechanism 10 and attached tines 37. The resultant force exerted by the chain 41 pivots the stand 39 into contact with the ground surface 59 thereby providing support for the mast assembly 11. The stop pins 53 are then removed from the aligned apertures 54 and 55 positioned, respectively, in the outer horizontal support bars 15 and the inner horizontal support bars 16. As shown, the inner bars 16 possess a plurality of uniformly spaced apertures 55 which can be individually and selectively aligned with the aperture 54 outer bar. In this way the lengths of the horizontal support member 14 can be adjustably fixed for compatibility with the length of the truck bed on which the lift unit is to be mounted.

The operator then re-enters the tractor cab and drives forwardly while the masts 12 are held stationary on the stand 39. This produces withdrawal of the inner supports 16 from the outer supports 15 and resultant longitudinal expansion of the horizontal support members 14 until the latch 60 falls into a positioning slot in one of the inner supports 16 thereby establishing the relative positions shown by the phantom lines in FIG. 3.

Figure 3:
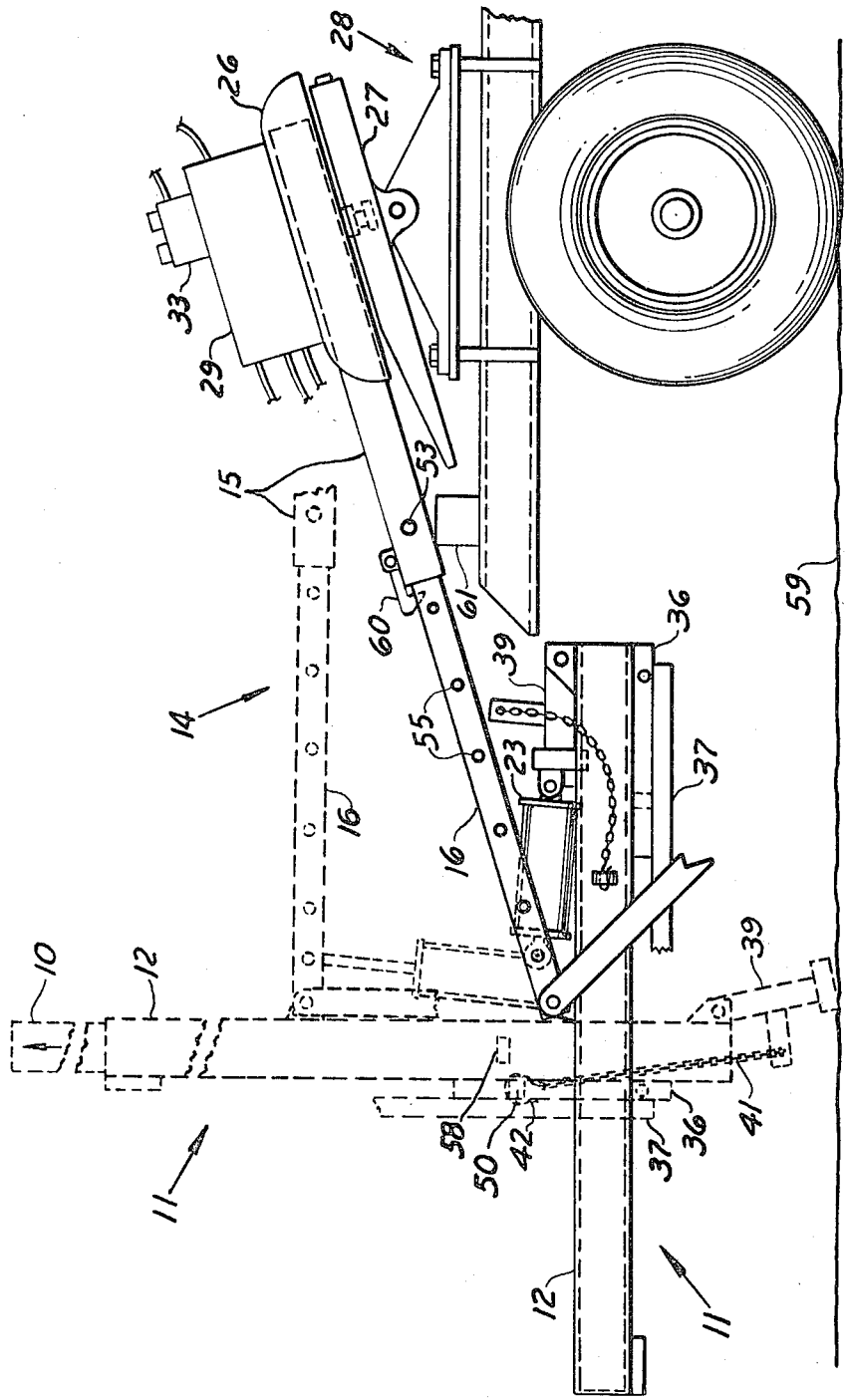
FIG. 3 is a schematic view illustrating the embodiment of FIG. 1 in a partially collapsed position.

At this time the operator actuates the control unit 33 so as to produce an in-stroke of the piston rod 22 and rotation of the lift assembly 11 about the retaining pins 17. As the stand 39 is raised off the surface 59, the fifth wheel 27 tilts until the horizontal support members 14 engage the stops 61 on the tractor's bed as illustrated in FIG. 3.

Figure 4:
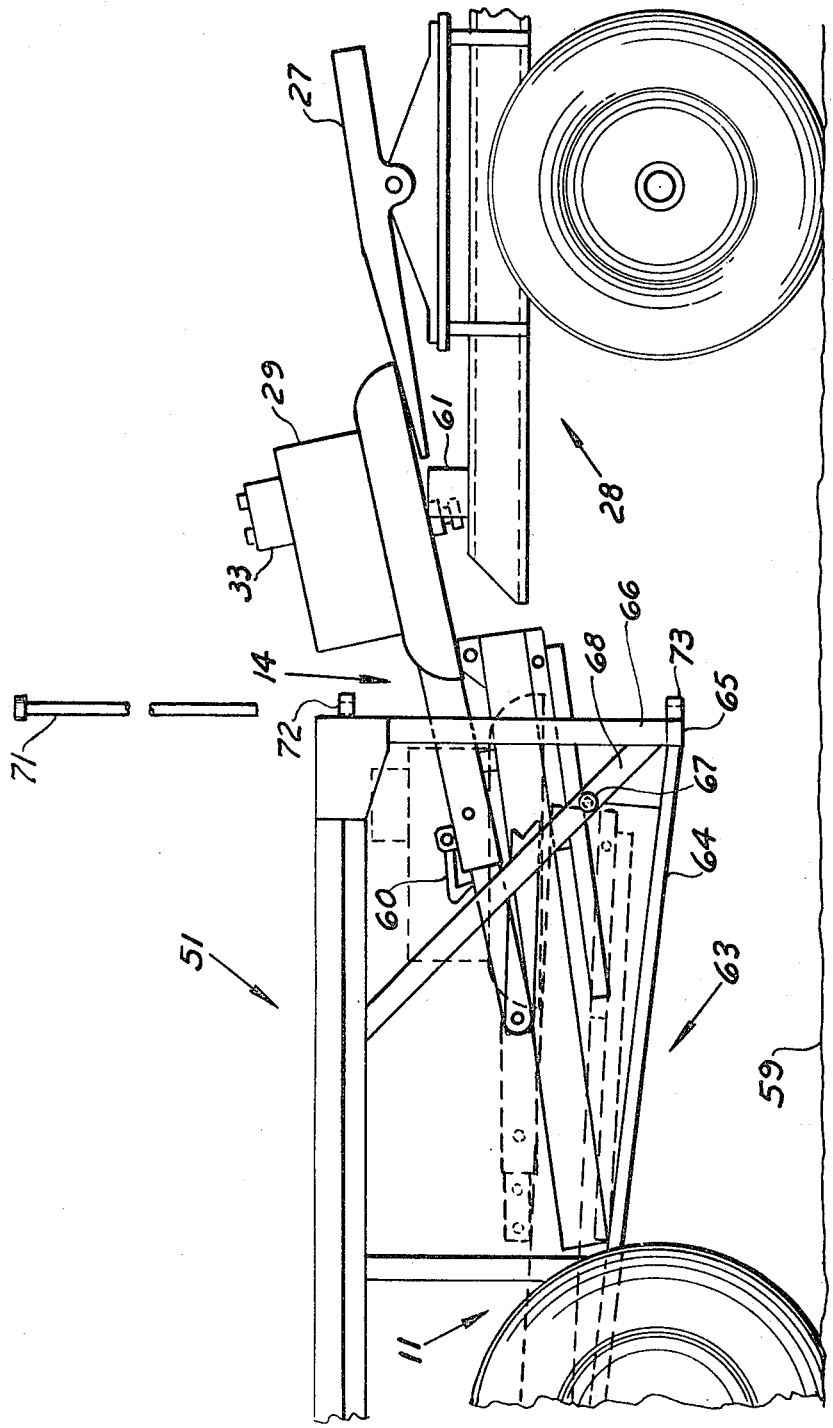
FIG. 4 is a schematic view showing the embodiment of FIG. 1 in a fully collapsed, stored position beneath a trailer bed.

After driving the tractor into a position adjacent the rear of the trailer bed 51, the driver slowly backs the collapsed lift assembly 11 toward the frame 63 which, as shown in FIG. 4, includes the inclined base plate 64 connected between the underside of the trailer bed 51 and the cross bar 65 which is also supported from the trailer bed 51 by the vertical supports 66. As the leading edge of the mast assembly 11 passes under the trailer bed 51 it engages the inclined base plate 64 and slides upwardly thereon until substantially the entire mast assembly is located beneath the trailer bed. The retaining bar 67 is then passed through the apertures in the diagonal braces 68 threby locking the mast assembly in place. This permits the driver to disconnect the mounting plate 26 from the fifth wheel 27 and drive the tractor away from the lift assembly 11. Further contraction of the cylinder and piston assembly 21, 22 prompts rotation of the horizontal support members 14 and lowering of the power pack unit 29, which is then manually pushed toward the trailer bed 51 causing the attached outer support members 15 to slide along the inner support members 16 until the relative positions shown by phantom lines in FIG. 4 are obtained. Unintentional withdrawal of the power pack 29 and attached outer support members 15 is prevented by fixing these units to the trailer bed by the pin 71 which passes through upper boss 72 and lower boss 73.

After demounting and stowing of the mast assembly 11, the trailer unit can be coupled to the tractor and transported to any other desired location. It will be obvious, that withdrawal of the lift assembly 11 from the frame 63 and mounting thereof on the tractor bed 28 is accomplished by a reversal of the demounting steps described above.

Obviously, many modifications and variations of the present invention are possible in light of the above teachings. For example, the stowing frame 63 can be mounted in other positions either above or below the trailer bed 51. Similarly, although the illustrated self-contained embodiment is preferred, the invention can be adapted for connection with the hydraulic systems already existing on many conventional tractors in which case the separate power pack 29 can be eliminated.

What is claimed is:

1. A power lift apparatus adapted to be demountably supported on the tractor bed of a truck trailer combination and comprising; a mast assembly, lift means supported by said mast assembly and adapted for movement thereon, an elongated longitudinally extendable horizontal support member pivotally attached to said mast assembly and adapted for demountable connection to the tractor bed, said horizontal support member adapted while connected to the tractor bed to permit substantial movement of said mast assembly in a horizontal direction away from the tractor bed, vertical support means adapted for demountable connection between said mast assembly and the tractor bed so as to provide vertical support therebetween, and wherein with said horizontal support member in an extended position said mast assembly is adapted for pivotal movement from a substantially vertical position to a substantially horizontal position along a path wherein the upper portion of said mast assembly moves away from said tractor bed and the lower portion of said mast assembly moves toward said tractor bed.

2. A power lift apparatus according to claim 1 including a power means adapted upon energization to produce said pivotal movement of said mast assembly.

3. A power lift apparatus according to claim 2 wherein said power means comprises a hydraulic cylinder operatively connected to said mast assembly at a point substantially below the point of pivotal connection between said mast assembly and said horizontal support means.

4. A power lift apparatus according to claim 1 wherein said horizontal support means is adapted for attachment to the fifth wheel on said tractor bed.

5. A power lift apparatus according to claim 4 wherein said horizontal support means includes a power pack adapted for mounting on said fifth wheel and for actuation of said lift means.

6. A power lift apparatus according to claim 5 including a power means adapted upon energization to produce said pivotal movement of said mast assembly.

7. A power lift apparatus according to claim 6 wherein said power means comprises a hydraulic cylinder operatively connected to said mast assembly at a point substantially below the point of pivotal connection between said mast assembly and said horizontal support means.

8. A power lift apparatus according to claim 1 including an adjustable stand means adapted upon actuation into an operative position to support said mast assembly from the surface supporting said tractor.

9. A power lift apparatus according to claim 8 wherein said stand means is adapted for actuation by movement of said lift means.

10. A power lift apparatus according to claim 8 including a power means adapted upon energization to produce said pivotal movement of said mast assembly.

11. A power lift apparatus according to claim 10 wherein said power means comprises a hydraulic cylinder operatively connected to said mast assembly at a point substantially below the point of pivotal connection between said mast assembly and said horizontal support means.

12. A power lift apparatus according to claim 11 wherein said horizontal support means is adapted for attachment to the fifth wheel on said tractor bed.

13. A power lift apparatus according to claim 12 wherein said horizontal support means includes a power pack adapted for mounting on said fifth wheel and for actuation of said lift means.

14. A power lift apparatus according to claim 13 wherein said stand means is adapted for actuation by movement of said lift means.

15. A power lift apparatus according to claim 14 including selective stop means adapted to selectively lock expansion movement of said horizontal support means in a plurality of longitudinal positions.

16. A power lift apparatus according to claim 1 including a trailer adapted for connection to said tractor bed and including a mounting frame attached to the underside of its bed and adapted to support said mast assembly upon disconnection thereof from said tractor bed.

17. A power lift apparatus according to claim 16 including a power means adapted upon energization to produce said pivotal movement of said mast assembly.

18. A power lift apparatus according to claim 17 wherein said power means comprises a hydraulic cylinder operatively connected to said mast assembly at a point substantially below the point of pivotal connection between said mast assembly and said horizontal support means.

19. A power lift apparatus according to claim 18 wherein said horizontal support means is adapted for attachment to the fifth wheel on said tractor bed.

20. A power lift apparatus according to claim 19 wherein said horizontal support means includes a power pack adapted for mounting on said fifth wheel and for actuation of said lift means.

References Cited
UNITED STATES PATENTS

| | | | |
|---|---|---|---|
| 2,754,020 | 7/1956 | Dunn et al. | 214—670 X |
| 2,900,099 | 8/1959 | Cook. | |
| 2,910,203 | 10/1959 | Todd | 214—672 |
| 2,962,180 | 11/1960 | Vossenberg | 214—674 |

GERALD M. FORLENZA, *Primary Examiner.*

F. E. WERNER, *Assistant Examiner.*